United States Patent

Sutherland

[11] 3,853,009
[45] Dec. 10, 1974

[54] AUTOMATIC WATER SAMPLER

[76] Inventor: William Sutherland, 145 Monk St., North Bay, Ontario, Canada

[22] Filed: Oct. 25, 1972

[21] Appl. No.: 300,671

[52] U.S. Cl. ............................... 73/423 R, 73/291
[51] Int. Cl. ............................................. G01n 1/10
[58] Field of Search ....... 73/423 R, 425.4 R, 421 R, 73/291, 304 R, 321; 318/482

[56] References Cited
UNITED STATES PATENTS

| | | | |
|---|---|---|---|
| 2,470,510 | 5/1949 | Matson et al. | 73/304 R |
| 2,566,260 | 8/1951 | Thomson | 318/482 X |
| 3,153,345 | 10/1964 | Berg | 73/423 R |
| 3,252,420 | 5/1966 | Sorensen | 318/482 X |
| 3,670,577 | 6/1972 | Singer | 73/423 R |

Primary Examiner—Richard C. Queisser
Assistant Examiner—Daniel M. Yasich

[57] ABSTRACT

Apparatus for automatically collecting liquid samples, as for use in measuring water pollution. Included therein is a small metallic sampling cup suspended by a cable for immersion in the body of liquid to be sampled, a reversible electric motor driving a winch for the cable to raise and lower the sampling cup, and a tilting receiver unit for dumping liquid from the full cup in its uppermost position into a collecting bucket. The motor is provided with a reversing relay which when de-energised operates the motor in a first or lowering direction for the sampling cup. The cup includes therein a pair of spaced electrodes, one of which is defined by the metallic bottom wall of the cup, which are conductively bridged by a predetermined level of liquid in the cup to energise the reversing relay for operation of the motor in the opposite or lifting direction.

2 Claims, 5 Drawing Figures

PATENTED DEC 10 1974 3,853,009
SHEET 1 OF 2
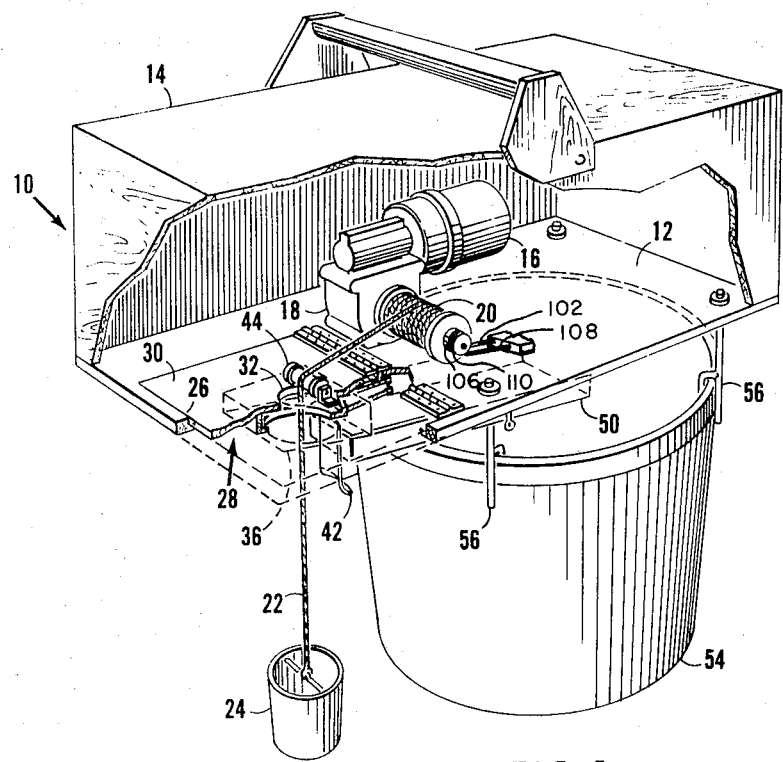
FIG 1
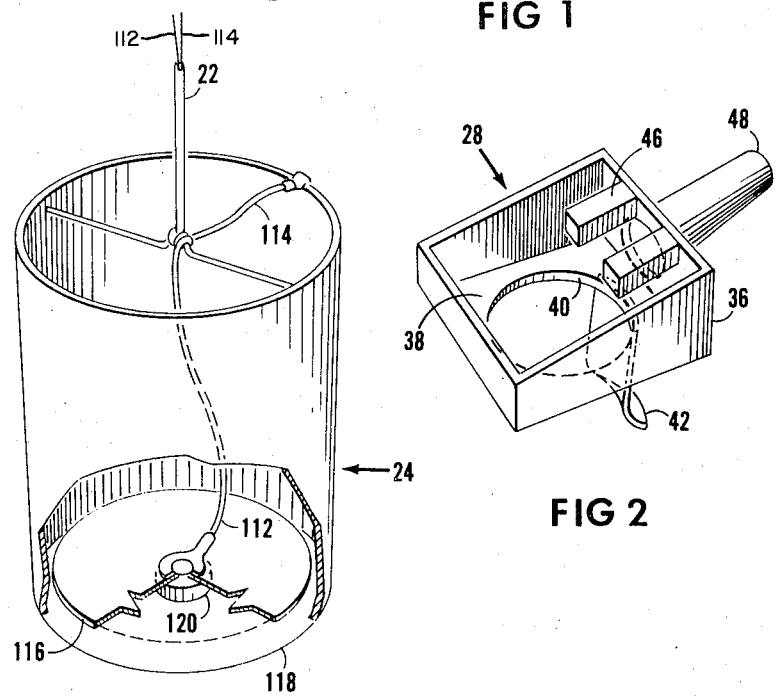
FIG 2
FIG 3

AUTOMATIC WATER SAMPLER

This invention relates generally to sampling apparatus, and more particularly to apparatus for collecting liquid samples from, e.g., a body of water such as a river or sewer.

It is a primary object of the invention to provide improved apparatus for automatically collecting liquid samples.

It is another object of the invention to provide such collecting apparatus which will perform multiple operating cycles automatically without human intervention.

It is yet another object of the invention to provide such collecting apparatus which may be adapted to shut itself off after a predetermined number of collecting operations corresponding to a desired liquid sample volume.

A further object of the invention is the provision of such collecting apparatus which is compact, lightweight, simple and reliable in operation.

Still a further object is the provision of such collecting apparatus which is powered by readily available power sources and which, if desired, may include a self-contained power source for portable operation.

These, as well as other objects which will become apparent as the description proceeds, are achieved through the provision of the inventive collecting apparatus characterised by a small sampling cup suspended by a cable for immersion in the body of liquid to be tested, a reversible electric motor driving a winch for the cable to raise and lower the sampling cup, and a tilting receiver unit for dumping liquid from the filled cup in its uppermost position into a collecting bucket. The motor is provided with a reversing relay which when de-energised operates the motor in a first or lowering direction for the sampling cup. The cup includes therein a pair of vertically spaced electrodes, one of which is preferably defined by the metallic bottom wall of the cup, which are conductively bridged by a predetermined level of liquid in the cup to energise the reversing relay for operation of the motor in the opposite or lifting direction.

The invention itself will be better understood, and additional objects, features and advantages thereof will become apparent, from the following detailed description of a preferred embodiment thereof, taken in conjunction with the accompanying drawings.

IN THE DRAWINGS

FIG. 1 is a pictorial view of the inventive collecting apparatus, with parts thereof broken away for clarity.

FIG. 2 is an enlarged pictorial view of the tilting receiver unit of FIG. 1.

FIG. 3 is an enlarged pictorial view of the sampling cup of FIG. 1, partly broken away.

Figure 4:
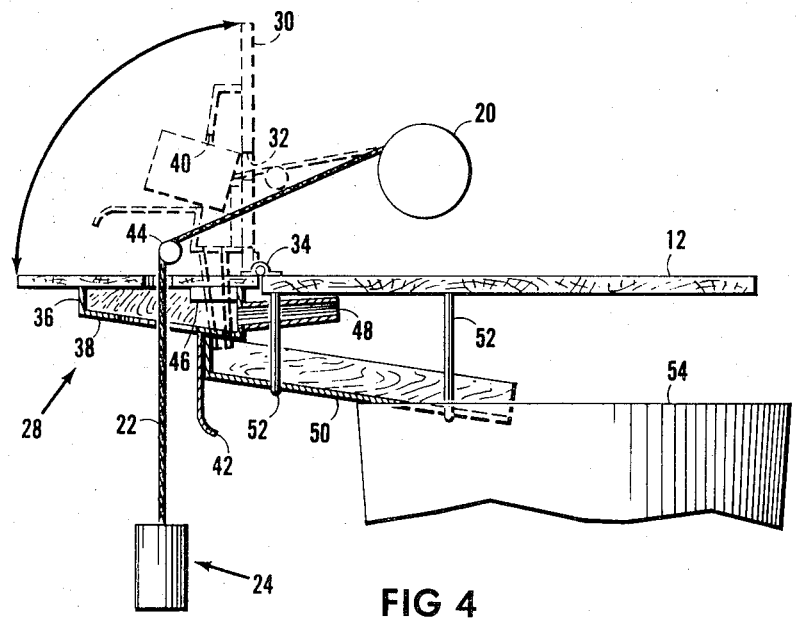
FIG. 4 is a side sectional view of the apparatus of FIG. 1 showing the sampling cup and receiving unit in respective lowered and raised positions.

Referring to the drawings, the inventive sample collecting apparatus is shown as comprising a housing or casing 10 having a bottom wall 12 and a cover portion 14, the latter preferably being hingedly or removably connected to the bottom wall 12 by suitable means, not shown, to provide access to the interior of the housing, as for maintenance. Mounted on the bottom wall 12 is a reversible electric motor 16 which, through a suitable speed-reduction transmission 18, drives the drum 20 of a reversible hoist or winch. A supporting cable 22 is wound at one end about the winch drum 20, and serves to support at its lower or free end a metallic sampling cup generally indicated by reference numeral 24, and it will be readily apparent that operation of the electric motor 16 and hence the winch drum 20 in either direction will serve to respectively raise or lower the sampling cup 24. Thus, the cup may be lowered for immersion in a body of water to be sampled, as for example through a manhole into a sewer line, and may then be raised to retrieve the liquid sample for subsequent collection. As will be described more fully at a later point, the apparatus includes switching means for automatically controlling such raising and lowering of the sampling cup 24 responsive to the presence or absence of a predetermined volume of liquid therein.

As best seen in FIG. 1, the bottom wall 12 of the housing 10 includes a cut-out portion 26 at the forward end thereof, thereby defining a forwardly disposed opening in the bottom of the housing. Mounted within this opening, and hingedly connected at its rearward edge to the rearward edge of the opening 26 for upward pivotal movement, is a tilting receiver unit generally designated by reference numeral 28 which serves to dump fluid from the filled or partially filled sampling cup, in the uppermost position of the latter, into a suitable collection receptacle. More particularly, it will be seen that the receiver unit 28 comprises a generally flat base plate 30 having a small, generally central opening or orifice 32 sufficiently large in diameter to permit free passage of the cable 22 therethrough but considerably smaller than the diameter of the sampling cup 24, the base plate 30 being pivotally connected along its rear edge to the bottom wall 12 at the rear of opening 26 by hinges 34 or the like. A generally rectangular, hollow receiver box 36 defining therein a receiver chamber is secured to the underside of the base plate 30 surrounding the opening 32 and includes a bottom wall 38 having an enlarged central opening 40 sufficiently great in diameter to freely receive therein the upper portion of the sampling cup as shown in phantom in FIG. 4. An arcuate depending guide member 42 is disposed on the rearward side of the enlarged opening 40 and preferably includes an outwardly flared lip at its lower end, such guide member serving both to guide the rising sampling cup 24 smoothly into the enlarged opening 40 and to support the cup in the tilted position of the receiver unit, shown in phantom in FIG. 4.

A freely rotatable pulley or roller 44 for the cable 22 is secured to the base plate 30 immediately above the central opening 32 therein by suitable support brackets, and serves to smoothly guide the cable through such central opening in all positions of the tilting receiver unit. One or more stop blocks 46 are secured to the underside of the base plate 30 adjacent the central opening 32 and serve to define the uppermost limit of travel of the sampling cup 24 relative to the receiver unit. It should be noted that when the upwardly travelling cup comes into abutment with the stop blocks 46, further upward movement of the cable 22 will serve to tilt the receiver unit 28, together with the sampling cup 24, upwardly and rearwardly towards the position shown in dashed lines in FIG. 4, whereby the liquid contents of the cup will be dumped into the chamber defined within the receiver box 36.

The receiver unit 28 further includes a rearwardly extending discharge nozzle 48 (FIGS. 2 and 4) communicating with the interior of the receiver box 36. In the upper position of the receiver discharge nozzle 48 is oriented generally vertically and serves to discharge liquid from the receiver box into the forward end of a chute or trough 50 which is secured underneath the bottom wall 12 of the housing by suitable suspension brackets or hangers 52. This chute 50 is inclined downwardly and rearwardly and has an open rearward end which in turn serves to discharge the liquid into a collection receptacle such as a collection bucket 54, such bucket having a comparatively large internal volume and being similarly suspended from the bottom wall 12 by suitable brackets 56 (FIG. 1).

Figure 5:
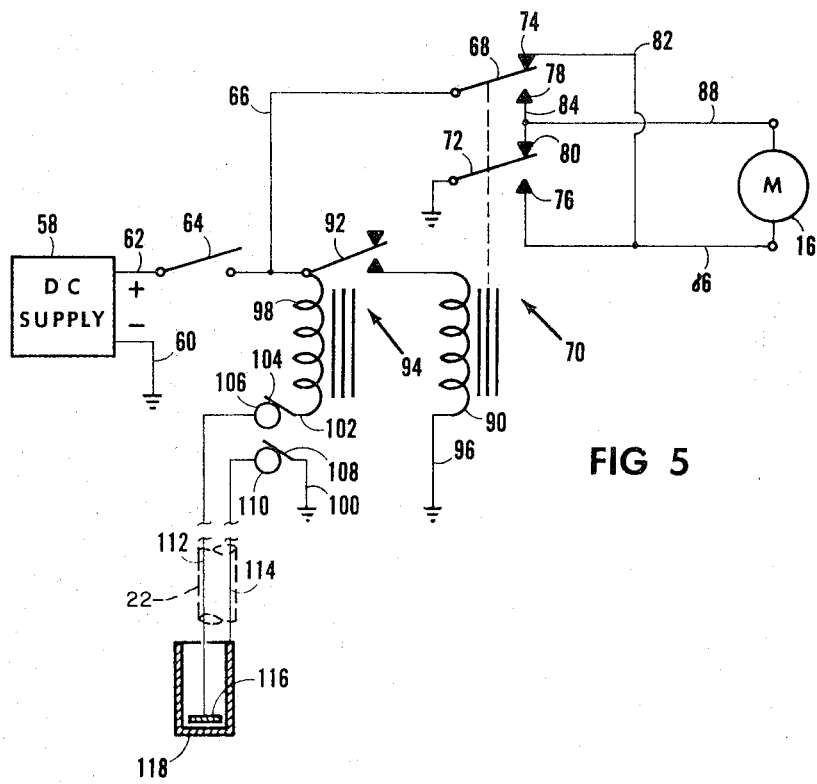
FIG. 5 is a schematic diagram of a preferred control and operating circuit for the apparatus of FIG. 1.

As previously mentioned, the inventive collecting apparatus includes circuit means for automatically effecting successive operating cycles of the apparatus, and specifically for raising the sampling cup 12 when a predetermined volume of water or other liquid has entered thereinto and for lowering the cup for subsequent reimmersion following emptying of the contents of the sampling cup into the collection bucket 54 by way of the receiver box 36, discharge nozzle 48 and trough or chute 50. Referring at this point to FIG. 5, illustrating a preferred power and control circuit for the apparatus, there is provided a DC power supply 58 which may, for example, comprise a storage battery or which may comprise a step-down transformer and full-wave rectifier to permit operation from a conventional AC line cord. Advantageously, both of the above arrangements may be provided together with suitable switching means for selecting the AC or DC power source for flexibility of operation, the DC output preferably being 12 volts DC and in any event having its negative lead 60 connected to ground to permit use of a common ground return.

The positive lead 62 of the DC output is connected across a SPST on-off switch 64, through line 66, to one movable armature 68 of a high-current DPDT reversing relay 70, the other movable armature 72 of which is connected to ground. The stationary contacts 74, 76 and 78, 80 of the reversing relay are respectively cross-connected by conductors 82 and 84 to define, in known manner, a DPDT reversing switch, and are respectively connected by conductors 86 and 88 to opposite sides of the electric motor 16. Thus, as long as the on-off switch 64 is closed, the motor 16 will at all times be energised through line 66, armature 68, contact 74 or 78, and conductors 82 and 86 or 84 and 88, being grounded on the opposite side of the motor through the other movable armature 72, the position of the relay 70 determining the direction of rotation of the motor.

The coil 90 of the reversing relay 70 is connected at one side thereof to the on-off switch 64, in parallel with the above-described motor circuit, across the movable armature 92 of a comparatively low-current, normally closed SPST switching relay 94, the other side of coil 90 being connected to ground at 96. Thus, when the armature 92 of switching relay 94 closes, the coil 90 of reversing relay 70 will be connected between the positive lead 62 of the power supply 58 and ground 96 and will thus be energised to move the armatures 68 and 72 to their alternate positions to reverse operation of the motor. The switching relay 94 has its coil 98 connected in parallel with the motor circuit and with switching relay armature 94, between the on-off switch 64 and ground at 100, by a conductor 102 terminating in a first carbon brush 104. The brush 104 is urged against a first rotating collector ring 106 mounted on the winch drum 20, e.g., on the central shaft thereof, for rotation therewith. A second carbon brush 108 connected directly to ground 100 is urged against a second collector ring 110 similarly mounted on the winch drum, and the collector rings 106, 110 are in turn respectively connected to a pair of conductors 112 and 114 disposed within the supporting cable 22. Conductor 114, communicating with ground 100, is secured at its lower or free end to the metallic wall of the sampling cup 24, as by soldering; the other conductor 112, connected through the switching relay coil 98 to the positive supply terminal 62, is secured at its lower or free end to a conductive plate-like electrode 116 which is insulated from the walls of the sampling cup and which is secured to and supported at a predetermined height from the bottom wall 118 of the cup by one or more insulating spacer members 120.

It will be appreciated that the electrode 116, and the bottom wall 118 of the sampling cup 24 defining essentially a second electrode, form in effect a switching means for the switching relay circuit which will close when a sufficient volume of conductive or partially conductive liquid is present within the sampling cup to bridge the vertical gap between these electrodes. Closing of this switching means responsive to the presence of such liquid will close the circuit connecting the positive DC output lead 62 across the switching relay coil 98 and electrodes 116, 118 to ground 100, thus energising coil 98. This in turn closes the armature 92 of the switching relay 94, energising reversing relay coil 90 to shift the reversing relay armatures 68 and 72 to thereby reverse the connections to the electric motor 16. The connections to the motor relative to the two positions of the reversing relay 70 are selected such that when on-off switch 64 is closed and the remainder of the circuit is in its illustrated position, i.e., when the switching means defined by electrodes 116 and 118 is open and the relays 94 and 70 are hence de-energised, the motor will operate in a direction to unwind the winch 20 and thus to lower the sampling cup 24 into the body of water or other liquid being tested. In the opposite condition of the circuit, when sufficient conductive fluid is present to bridge the gap between electrodes 116 and 118, thus energising relays 70 and 94 and reversing the connections to the motor 16, the motor will then operate in the opposite direction to lift the sampling cup towards the receiver unit 28 for dumping into the collection receptacle 54.

The volume of liquid which is collected by the sampling cup 24 during each operating cycle will be determined essentially by the internal volume of the cup below the level of the plate-like electrode 116, i.e., by the internal diameter of the cup and by the height at which the electrode 116 is mounted relative to the bottom wall 118. Clearly, such volume may be varied readily by altering the height of electrode 116, as by utilising a thicker insulating spacer member 120 or a plurality of vertically stacked spacer members. The diameter of the electrode 116 is preferably chosen relative to the internal diameter of the cup such that the peripheral gap surrounding the electrode is substantially smaller than the vertical gap between such electrode and the bottom wall 118. In this manner, when the cup is tilted to its generally horizontal position shown in phantom in FIG. 4 during emptying, a small amount of the liquid will suffice to conductively bridge such peripheral gap, whereby substantially all of the liquid contents of the cup will be emptied before the circuit is opened and the relays 94 and 70 are de-energised to again lower the cup for a further load.

In operation, the apparatus is positioned suitably so that the cup can be freely lowered into the body of liquid being tested without obstruction. To start the operating cycle, it is merely necessary to close the on-off switch 64; assuming that initially the cup 24 is empty, the operating circuit will be in the condition shown in FIG. 5 with relays 70 and 94 de-energised, and current will travel from the positive output lead 62 through on-off switch 64, line 66, armature 68 and contact 74 of reversing relay 70, and conductors 82 and 86 to the motor 16 to operate same in a forward direction, the current returning through conductors 88 and 84, and contact 80 and armature 72 of the reversing relay 70, to ground. The winch 20 will thus be driven in a corresponding forward direction, unwinding the cable 22 and lowering the sampling cup 24 into the body of water or other liquid being collected.

Upon immersion, the liquid will enter the cup and will rise until it reaches the level of the plate-like electrode 116, conductively bridging the gap between the electrode and the bottom wall 118 of the sampling cup. This closes the circuit from the positive supply lead 62 across coil 98 of switching relay 94, through line 102, 104, 106, 112, 116, 118, 114, 110 and 108 to ground at 100, energising coil 98 to close the movable armature 92 of the switching relay. Closing of armature 92 in turn connects the positive supply lead 62 to ground 96 across the coil 90 of the reversing relay 70, energising the latter coil and shifting the movable armatures 68 and 72 of reversing relay 70 to reverse the supply and ground connections to the motor 16. The motor will thus reverse its direction of rotation and will drive the winch 20 in the reverse direction, winding up the cable 22 and raising the sampling cup 24 towards the receiver unit 28.

When the rising cup reaches an elevated position wherein it abuts against the stop blocks 46 of the receiver unit, further winding-up of the cable 22 will cause the sampling cup to tilt the receiver unit upwardly and rearwardly about the hinges 34 until the receiver unit and cup reach the position shown in dashed lines in FIG. 4. At this point the sampling cup 24 is substantially horizontal, and its liquid contents are emptied into the receiver box 36, from which they pass through discharge nozzle 48 and chute or trough 50 to the collection bucket 54. During emptying of the cup, liquid will continue to bridge the narrow peripheral gap between the electrode 116 and the side walls of the cup, until insufficient liquid remains for this purpose. Then, the circuit containing the electrode 116, cup 118 and switching relay coil 98 will be opened, de-energising the switching relay coil, opening switching relay armature 92, de-energising reversing relay coil 90, and returning the reversing relay armatures 68 and 72 to their original positions. Thus, the circuit will again be in its original condition for lowering the sampling cup, and this sequence will again be repeated continuously until a suitable quantity of liquid has been collected in the basket 54, at which point the operating sequence may be halted by opening the on-off switch 64. Alternatively, it is contemplated that a stepping relay (not shown) may be utilised, connected to the on-off switch 64 in suitable manner so as to open the latter after a predetermined number of operating cycles corresponding to a desired volume of liquid to be collected.

It will thus be seen from the above description that the present invention provides an efficient and economical apparatus for automatically collecting liquid samples, comprising in its basic form a sampling container 24 having a closed bottom wall 118 and an open top; a supporting cable 22 secured at its lower end to the container; a winch 20 about which the upper end of the cable is wound; a reversible electric motor 16 drivingly connected to the winch; liquid level sensing means defined by electrodes 116 and 118 within the container for sensing a predetermined level of liquid therein; and electric switching means defined by relays 70 and 94 and operatively connecting the electric motor to the sensing means for reversing the connections to the motor responsive to the presence or absence of the predetermined level of liquid in the container.

I claim as my invention:

1. Apparatus for automatically collecting fluid samples from an effluent stream or the like and comprising in combination: a housing supportable above the stream; a sampling container having a closed bottom wall and side walls defining an open top; a supporting cable secured at one end thereof to said sampling container; a winch mounted on said housing, said supporting cable being wound at its opposite end about said winch; a reversible electric motor drivingly connected to said winch; a direct current power supply for said electric motor; a pair of vertically spaced electrodes defining liquid level sensing means, one of said electrodes being disposed adjacent the bottom within said sampling container and the other of said electrodes being spaced by a gap thereabove at a predetermined height defining a predetermined liquid level in said container, conductive liquid in said sampling container at or above said predetermined liquid level forming a conductive path across said gap and bridging said electrodes; and electric switching means responsive to said sensing means sensing a liquid level at said predetermined level at least to switch said motor in one direction for raising said sampling container towards said housing responsive to said predetermined level of liquid therein and switching said motor in the opposite direction lowering said sampling container responsive to a liquid level therein below said predetermined level; said electric switch means comprising a double-poled, double-throw reverse relay having its points connected in series with said motor and said power supply, said reversing relay having a coil energized by bridging of said electrodes by said conductive liquid.

2. Apparatus for automatically collecting liquid samples as claimed in claim 1, wherein said electric switching means further comprises a switching relay having a coil connected in series with said electrodes and a normally open movable armature connected in series with said coil of said reversing relay.

* * * * *